(12) United States Patent
Chi et al.

(10) Patent No.: US 9,765,184 B2
(45) Date of Patent: Sep. 19, 2017

(54) POLYCARBONATE AND METHOD OF PREPARING THE SAME

(75) Inventors: Jun Ho Chi, Uiwang-si (KR); O Sung Kwon, Uiwang-si (KR); Jong Chan Hur, Uiwang-si (KR); Hyuck Man Kwon, Uiwang-si (KR); Bok Nam Jang, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 692 days.

(21) Appl. No.: 14/345,459

(22) PCT Filed: Dec. 13, 2011

(86) PCT No.: PCT/KR2011/009596
§ 371 (c)(1),
(2), (4) Date: Sep. 16, 2014

(87) PCT Pub. No.: WO2013/042827
PCT Pub. Date: Mar. 28, 2013

(65) Prior Publication Data
US 2015/0038615 A1 Feb. 5, 2015

(30) Foreign Application Priority Data
Sep. 21, 2011 (KR) .................. 10-2011-0095429

(51) Int. Cl.
*C08G 64/00* (2006.01)
*C08G 64/08* (2006.01)
*C08L 69/00* (2006.01)
*C08G 63/02* (2006.01)

(52) U.S. Cl.
CPC ............ *C08G 64/083* (2013.01); *C08L 69/00* (2013.01)

(58) Field of Classification Search
CPC .................................................. C08G 64/083
USPC .............................................. 528/196, 198
See application file for complete search history.

(56) References Cited

U.S. PATENT DOCUMENTS

| | | | |
|---|---|---|---|
| 5,286,834 A | 2/1994 | Sakashita et al. | |
| 5,401,826 A | 3/1995 | Sakashita et al. | |
| 5,470,938 A | 11/1995 | Sakashita et al. | |
| 5,532,324 A | 7/1996 | Sakashita et al. | |
| 6,713,544 B2 | 3/2004 | Eckel | |
| 6,753,405 B2 | 6/2004 | Kratschmer et al. | |
| 8,415,438 B2 | 4/2013 | Freitag | |
| 2004/0013882 A1* | 1/2004 | Gorny | B32B 27/36 428/412 |
| 2007/0149661 A1* | 6/2007 | Charati | C08K 5/523 524/115 |
| 2010/0130703 A1 | 5/2010 | Freitag | |
| 2011/0039987 A1 | 2/2011 | Freitag | |
| 2013/0085252 A1* | 4/2013 | Kwon | C08G 64/1608 528/204 |

FOREIGN PATENT DOCUMENTS

| | | |
|---|---|---|
| CN | 1397582 A | 2/2003 |
| CN | 101321804 A | 12/2008 |
| EP | 0544407 A1 | 6/1993 |
| JP | 05-117382 A | 5/1993 |
| JP | 07-118381 A | 5/1995 |
| KR | 10-2008-0104261 A | 12/2008 |
| WO | 2013/042827 A1 | 3/2013 |

OTHER PUBLICATIONS

Office Action in counterpart Chinese Application No. 201180073635.9 dated Jan. 4, 2015, pp. 1-11.
English-translation of Office Action in counterpart Chinese Application No. 201180073635.9 dated Jan. 4, 2015, pp. 1-13.
International Search Report in counterpart International Application No. PCT/KR2011/009596 dated Oct. 29, 2012, pp. 1-2.

* cited by examiner

*Primary Examiner* — Terressa Boykin
(74) *Attorney, Agent, or Firm* — Additon, Higgins & Pendleton, P.A.

(57) ABSTRACT

A polycarbonate resin of the present invention is characterized by comprising repeating units represented by Formula 1, Formula 2, Formula 3 and Formula 4, respectively.

13 Claims, No Drawings

POLYCARBONATE AND METHOD OF PREPARING THE SAME

CROSS-REFERENCE TO RELATED APPLICATIONS

This application claims priority to and the benefit of International Application No. PCT/KR2011/009596, filed Dec. 13, 2011, which published as WO 2013/042827 on Mar. 28, 2013, and Korean Patent Application No. 10-2011-0095429, filed in the Korean Intellectual Property Office on Sep. 21, 2011, the entire disclosure of each of which is incorporated herein by reference.

TECHNICAL FIELD

The present invention relates to a polycarbonate and a method of preparing the same. More specifically, the present invention relates to a polycarbonate having its own flame retardancy without blending with flame retardant, and further having excellent chemical resistance and impact property, and a method of preparing the same.

BACKGROUND ART

Polycarbonate resin is a representative thermoplastic material that has a heat deflection temperature of about 135° C. or higher and can exhibit superior mechanical properties including impact resistance, and excellent self-extinguishing properties, dimensional stability, heat resistance and transparency. Thus, polycarbonate resins are widely used in various applications, such as exterior materials of electronic and electric products, automobile components, and the like.

Thus, when the polycarbonate resin is used as exterior materials of electronic and electric products, or automobile components, flame retardancy to the polycarbonate resin has been required long before for safety in case of fire. For applying the polycarbonate resin to the exterior materials of home electronics, the polycarbonate resin should basically maintain transparency. Further, in order not to damage the polycarbonate resin by heat generated from the electronic components, it should have excellent heat resistance at the same time.

Recently, in order to exhibit a beauty in an appearance of products, it is often to paint the appearance. In this case, after diluting the paint in various organic solvent, the surface of the resin molding article is coated with the diluted paint, and then is dried. In such a process, the organic solvents used as the dilute are permeated into the polycarbonate, so they act as a cause to decrease transparency and mechanical rigidity. Therefore, in order to apply the polycarbonate to the products which can easily occur the contact with various organic solvents in living environment, the resistance to these organic solvent is required.

However, a lot of developments for concurrently improving the flame retardancy and chemical resistance of such a polycarbonate resin have not reported. Most of them have presented several methods for improving flame retardancy or chemical resistance alone.

The known method for concurrently improving chemical resistance and flame retardancy of the polycarbonate is a way to give flame retardancy through blending a resin having chemical resistance with a flame retardant. However, such a method is hard to have sufficient chemical resistance, but impact strength is rapidly deteriorated due to the flame retardant added so as to give flame retardancy. In order to compensate this, impact modifiers are used, but they result in greatly decreasing excellent transparency of the polycarbonate. Moreover, a method of improving flame retardancy or chemical resistance alone brings about a result that does not satisfy a physical property that is another important requirement.

Further, copolymerizing with functional monomer to give flame retardancy satisfied flame retardancy, but there is a drawback which could not satisfy chemical resistance that is the other important requirement.

In case of copolymerizing or blending with other resin to improve chemical resistance, chemical resistance of polycarbonate may be improved, but its transparency is greatly decreased. Thereby, it is impossible to fundamentally improve flame retardancy.

DISCLOSURE

Technical Problem

It is an object of the present invention is to provide a polycarbonate having its own flame retardancy and chemical resistance without blending with other components, and a method of preparing the same.

It is another object of the present invention is to provide a polycarbonate having excellent flame retardancy, chemical resistance, fluidity, impact strength and heat resistance in comparison with the existing polycarbonate while maintaining transparency, and a method of preparing the same.

The above-mentioned aspects and other aspects may be accomplished by the present invention as explained below.

Technical Solution

One aspect of the present invention relates to a polycarbonate. The polycarbonate comprises repeating units represented by Formula 1, Formula 2, Formula 3 and Formula 4, respectively:

[Formula 1]

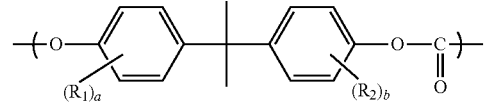

(wherein, $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, and a and b are each independently an integer from 0 to 4);

[Formula 2]

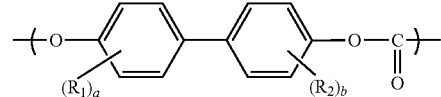

(wherein, $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, and a and b are each independently an integer from 0 to 4);

[Formula 3]

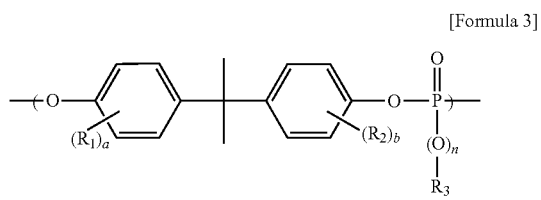

(wherein, $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, $R_3$ is substituted or unsubstituted C1 to C6 alkyl group, substituted or unsubstituted C6 to C12 aryl group, substituted or unsubstituted C7 to C20 aralkyl group, a and b are each independently an integer from 0 to 4, and n is 0 or 1); and

[Formula 4]

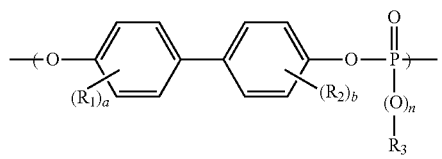

(wherein, $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, $R_3$ is substituted or unsubstituted C1 to C6 alkyl group, substituted or unsubstituted C6 to C12 aryl group, substituted or unsubstituted C7 to C20 aralkyl group, a and b are each independently an integer from 0 to 4, and n is 0 or 1).

In another aspect, the polycarbonate is characterized by containing about 1~50 mol % of repeating units of Formula 4 based on the repeating units, and having a glass transition temperature of about 130 to about 190° C., a flame retardancy of V-0, as measured on a 3.2 mm thick specimen according to the UL-94, a notched IZOD impact strength of about 25 to about 120 kg·cm/cm, as measured on a ⅛" thick specimen at room temperature according to ASTM D256, and a transmittance difference (ΔT) of about 12% or less, as calculated by the following Equation 1:

[Formula 4]

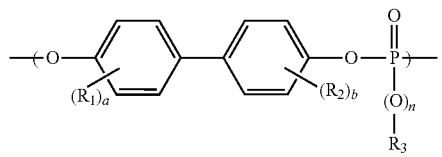

(wherein, $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom; $R_3$ is substituted or unsubstituted C1 to C6 alkyl group, substituted or unsubstituted C6 to C12 aryl group, substituted or unsubstituted C7 to C20 aralkyl group, a and b are each independently an integer from 0 to 4, and n is 0 or 1), $$\Delta T = \frac{T_0 - T_1}{T_0} \times 100 \quad \text{[Equation 1]}$$

(wherein, $T_0$ is initial visible light transmittance of a 2.5 mm thick sample, and $T_1$ is visible light transmittance of the sample obtained by immersing the sample in a solution consisting of methyl isobutyl ketone, cyclohexanone and 2-ethoxy ethanol for 2 minutes and then drying the sample at 80° C. for 30 minutes).

In one embodiment, the polycarbonate may comprise repeating units of Formula 1 (M1), Formula 2 (M2), Formula 3 (M3) and Formula 4 (M4) in mole ratio of M1:M2:M3:M4=about 20~90 mol %:about 5~50 mol %:about 1~50 mol %:about 1~50 mol %.

A further aspect of the present invention relates to a method of preparing polycarbonate. The method comprises transesterifying diols comprising Formula 1-1 and Formula 2-1 with carbonate esters and phosphate esters:

[Formula 1-1]

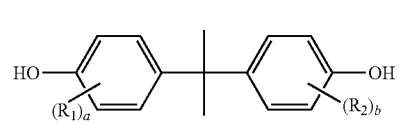

(wherein, $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, and a and b are each independently an integer from 0 to 4); and

[Formula 2-1]

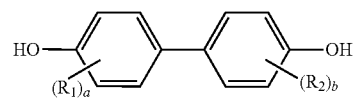

(wherein $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom; and a and b are each independently an integer from 0 to 4).

The phosphate esters may be at least one of aromatic phosphates and aromatic phosphonates.

In one embodiment, the phosphate ester may be represented by Formula 4-1:

[Formula 4-1]

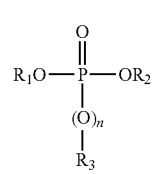

(wherein, $R_1$ and $R_2$ are each independently C6 to C12 aryl group, or C1 to C12 alkyl group substituted C6 to C12 aryl group, $R_3$ is substituted or unsubstituted C1 to C6 alkyl group, substituted or unsubstituted C6 to C12 aryl group, substituted or unsubstituted C7 to C20 aralkyl group, and n is 0 or 1).

In one embodiment, the mole ratio of Formula 1-1 to Formula 2-1 may be about 60~95 mol %:about 5~40 mol %.

In one embodiment, the mole ratio of the carbonate esters to the phosphate esters may be about 60~99 mol %:about 1~40 mol %.

A further aspect of the present invention relates to a thermoplastic resin composition comprising the polycarbonate. In one embodiment, the thermoplastic resin composition comprises the polycarbonate; and a thermoplastic resin.

In one embodiment, the thermoplastic resin composition may further comprise additives selected from the group consisting of antioxidants, nucleation agents, surfactants, coupling agents, fillers, plasticizers, lubricants, antimicrobial agents, release agents, heat stabilizers, light stabilizers, compatibilizers, inorganic additives, coloring agents, stabilizers, antistatic agents, pigments, dyes and flame proofing agents.

Advantageous Effects

The present invention has the inventive effect providing a polycarbonate having excellent flame retardancy and chemical resistance in comparison with a conventional polycarbonate, and excellent chemical resistance, fluidity, impact strength and heat resistance while maintaining transparency, and a method of preparing the same.

BEST MODE

A polycarbonate of the present invention is prepared by transesterifying diols with carbonate esters and phosphate esters.

In one embodiment, the diol may comprise Formula 1-1 and Formula 2-1:

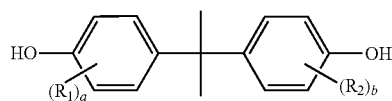

[Formula 1-1]

(wherein, $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, and a and b are each independently an integer from 0 to 4).

Examples of Formula 1-1 may include 2,2-bis(4-hydroxyphenyl)propane, 2,2-bis(3,5-dimethyl-4-hydroxyphenyl)propane, 2,2-bis(3,5-diisopropyl-4-hydroxyphenyl)propane and the like. Among these, 2,2-bis-(4-hydroxyphenyl)-propane, also referred to as bisphenol-A, may be preferable.

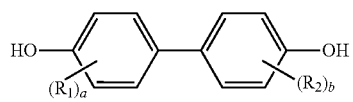

[Formula 2-1]

(wherein, $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom; and a and b are each independently an integer from 0 to 4).

Examples of Formula 2-1 may include 4,4'-biphenol, 2,2'-dimethyl 4,4'-biphenyldiol, 3,3-dimethyl 4,4-dihydroxy biphenyl, 2,2',6,6',-tetramethyl-4,4'-biphenol and the like. Among these, 4,4'-biphenol may be preferable.

In another embodiment of the present invention, in addition to diols having the above-mentioned structures, other diol components can be further comprised within the range to not inhibit the object of the present invention. Examples of diols may include hydroquinone, resorcinol, 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, 1,2-cyclopentanediol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,2-cycloheptanediol, 1,3-cycloheptanediol, 1,4-cycloheptanediol, 1,2-cyclooctanediol, 1,3-cyclooctanediol, 1,4-cyclooctanediol, and the like, without being limited thereto. These may be used alone or in combination of two or more thereof.

In one embodiment, the mole ratio of Formula 1-1 to Formula 2-1 may be about 60~95 mol %:5~40 mol %. Within this range, balance between physical properties including impact strength, chemical resistance and fluidity can be obtained.

In one embodiment, the carbonate ester may be represented by Formula 3-1:

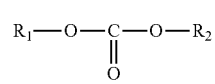

[Formula 3-1]

(wherein, $R_1$ and $R_2$ are each independently C1 to C6 alkyl or C6 to C20 aryl, and are the same or different).

In the embodiments, examples of the carbonate ester may include diphenyl carbonate, ditolyl carbonate, bis(chlorophenyl)carbonate, m-cresyl carbonate, dinaphthylcarbonate, bis(diphenyl)carbonate, diethyl carbonate, dimethyl carbonate, dipropylcarbonate, dibutyl carbonate, methylethylcarbonate, methylpropylcarbonate, ethylpropylcarbonate, dicyclohexyl carbonate and the like, without being limited thereto. These may be used alone or as mixtures thereof, and among these, diphenyl carbonate may be preferable.

The phosphate ester may be at least one of aromatic phosphates and aromatic phosphonates. Among these, aromatic phosphonates may be more preferred in reactivity and balanced physical properties.

In an embodiment, the phosphate ester may be represented by Formula 4-1:

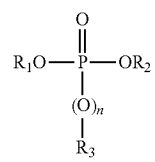

[Formula 4-1]

(wherein, $R_1$ and $R_2$ are each independently C6 to C12 aryl group, or C1 to C12 alkyl group substituted C6 to C12 aryl group, $R_3$ is substituted or unsubstituted C1 to C6 alkyl group, substituted or unsubstituted C6 to C12 aryl group, substituted or unsubstituted C7 to C20 aralkyl group, and n is 0 or 1).

Examples of the phosphate ester may include diphenyl phenylphosphonate (PDPP), dipheny lbenzylphosphonate (BDPP), diphenyl methylphosphonate (DPP), diphenylmethyl phenylphosphonate, diphenyl ethylphosphonate, diphenyl propylphosphonate, diphenyl butylphosphonate and etc.

In one embodiment, a mole ratio of the carbonate ester to phosphate ester may be about 60~99 mol %:about 1~40 mol %. Within this range, balance between physical properties including impact strength, chemical resistance and fluidity can be obtained.

In one embodiment of the present invention, diol compound having Formula 1-1 and Formula 2-1 may be used in the mole ratio of about 0.6~1.0, preferably the mole ratio of about 0.7~0.9 to the carbonate esters and the phosphate esters. Within this range, an excellent mechanical strength can be obtained.

In one embodiment, after adding diol compound, and carbonate ester and phosphate ester compound into a reactor, the polycarbonate can be prepared by carrying out transesterification. The transesterification may be performed under reduced pressure at about 150 to about 300° C., preferably about 160 to about 280° C., more preferably about 190 to about 270° C. Within this range, reaction rate can be appropriate and side reactions can properly decrease.

Further, the transesterification may be conducted under a reduced pressure at about 150 Torr or less, for example about 100 Torr or less, preferably about 50 Torr or less, and more preferably about 5 Torr or less for at least about 10 minutes or more, preferably about 15 minutes to about 24 hours, and more preferably about 15 minutes to about 12 hours. Within this range, reaction rate can be appropriate and side reactions can properly decrease.

In one embodiment of the present invention, the reaction may be conducted at the reaction temperature of about 160° C. to about 280° C. for about 2 to about 9 hours, to prepare a polycarbonate resin.

Transesterification may be performed in the presence of alkali metal and alkaline earth metal catalysts. Examples of the alkali metal and alkaline earth metal catalysts may include LiOH, NaOH, KOH and the like, without being limited thereto. These metals may be used alone or as mixtures. The amount of the catalyst may be determined based on the amount of the dihydroxy aromatic compound. In one embodiment of the present invention, the catalyst may be used in an amount of about $1 \times 10^{-8}$ mol to about $1 \times 10^{-3}$ mol based on about 1 mol of the dihydroxy aromatic compound. Within this range, sufficient reactivity can be obtained and generation of byproducts due to side reactions can be minimized, thereby exhibiting improvement in heat stability and color stability.

The polycarbonate prepared by the above method comprises repeating units represented by Formula 1, Formula 2, Formula 3 and Formula 4, respectively:

[Formula 1]

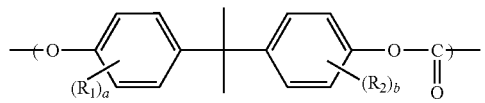

(wherein, $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, and a and b are each independently an integer from 0 to 4)

[Formula 2]

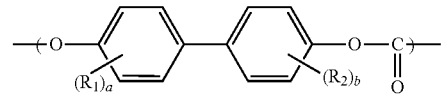

(wherein, $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, and a and b are each independently an integer from 0 to 4)

[Formula 3]

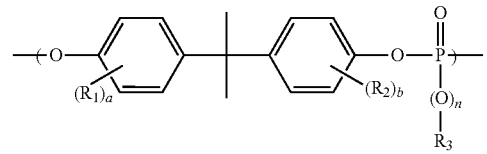

(wherein, $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, $R_3$ is substituted or unsubstituted C1 to C6 alkyl group, substituted or unsubstituted C6 to C12 aryl group, substituted or unsubstituted C7 to C20 aralkyl group, a and b are each independently an integer from 0 to 4, and n is 0 or 1)

[Formula 4]

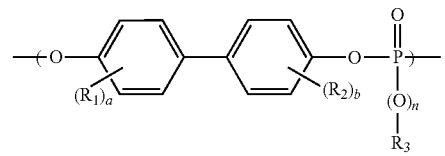

(wherein, $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, $R_3$ is substituted or unsubstituted C1 to C6 alkyl group, substituted or unsubstituted C6 to C12 aryl group, substituted or unsubstituted C7 to C20 aralkyl group, a and b are each independently an integer from 0 to 4, and n is 0 or 1).

The polycarbonate may comprise repeating units of Formula 1 (M1), Formula 2 (M2), Formula 3 (M3) and Formula 4 (M4) in mole ratio of M1:M2:M3:M4=about 20~90 mol %:about 5~50 mol %:about 1~50 mol %:about 1~50 mol %. Within this range, the polycarbonate has superior balance between physical properties including flame retardancy, heat resistance, chemical resistance, transparency and mechanical strength.

In particular, the polycarbonate of the present invention is characterized by containing about 1~50 mol % of repeating units of Formula 4 based on the repeating units, and having a glass transition temperature of about 130 to about 190° C., a flame retardancy of V-0, as measured on a 3.2 mm thick specimen according to the UL-94, a notched IZOD impact strength of about 25 to about 120 kg·cm/cm, as measured on a ⅛" thick specimen at room temperature according to ASTM D256, and a transmittance difference (ΔT) of about 12% or less, preferably about 10% or less, more preferably about 0~7%, as calculated by the following Equation 1:

$$\Delta T = \frac{T_0 - T_1}{T_0} \times 100 \qquad \text{[Equation 1]}$$

(wherein $T_0$ is initial visible light transmittance of a 2.5 mm thick sample, and $T_1$ is visible light transmittance of the sample obtained by immersing the sample in a solution consisting of methyl isobutyl ketone, cyclohexanone and 2-ethoxy ethanol for 2 minutes and then drying the sample at 80° C. for 30 minutes).

In one embodiment, the polycarbonate may have a mole ratio of Formula 1 (M1) and Formula 2 (M2) which satisfies the following condition:

M1≥M2

Preferably, M1>M2. In this case, heat resistance, and impact strength at room temperature are particularly excellent.

And, the mole ratio of M3 to M4 may be about 1:1 to about 1:2. Within this range, especially excellent balanced physical properties between flame retardancy and chemical resistance can be obtained.

Further, the polycarbonate of the present invention may contain phosphorus in a range of about 0.5~30 wt %. Within this range, the polycarbonate has excellent balance between physical properties including flame retardancy, transparency and impact strength.

The polycarbonate resin prepared according to the present invention has excellent flame retardancy, chemical resistance, transparency, fluidity and impact strength, while maintaining balance therebetween, and thus may be applied in various products. For example, the polycarbonate resin may be used for automobiles, machine parts, electric and electronic components, office machines such as computers, and miscellaneous goods and the like. In particular, the polycarbonate resin may be preferably employed not only for housings of electric and electronic products, such as TVs, computers, printers, washing machines, cassette players, stereos, cellular phones, game consoles and toys, but also for humidifiers, steam vacuum cleaners, steam irons, and the like. A molding method using the polycarbonate resin may be any conventional molding method, for example, extrusion molding, injection molding, vacuum molding, casting molding, blow molding, calendar molding and the like. These methods are well known to a person having ordinary knowledge in the art.

The polycarbonate resin may be used by blending with conventional thermoplastic resins. Examples of the thermoplastic resins may include all thermoplastic resins except the polycarbonate of the present invention. For example, polymethyl metacrylate, acrylic resin, aromatic vinyl resin, rubber modified aromatic vinyl resin, polyphenyl ether, polyphenyl sulfide, polyamide, polyolefin and the like may be used, but not limited to thereto. Further, the polycarbonate resin may optionally further comprise conventional additives depending on its use in molding the polycarbonate. Examples of additives include antioxidants, nucleation agents, surfactants, coupling agents, fillers, plasticizers, lubricants, antimicrobial agents, release agents, heat stabilizers, light stabilizers, compatibilizers, inorganic additives, coloring agents, stabilizers, antistatic agents, pigments, dyes and flame proofing agents and the like, without being limited thereto. These may be used alone or as mixtures thereof.

Next, the present invention will be explained in more detail with reference to the following examples. These examples are provided for illustrative purposes only and are not to be in any way construed as limiting the present invention.

MODE FOR INVENTION

Example 1

2.85 kg of 2,2-bis(4-hydroxyphenyl)propane (bisphenol A), 0.12 kg of 4,4'-biphenol, 2.78 kg of diphenyl carbonate, 0.21 kg of diphenyl phenylphosphonate, and 150 ppb of KOH (based on 1 mol of bisphenol A) were sequentially added to a reactor, and oxygen in the reactor was removed using nitrogen. The reactor was heated to 160° C. and then to 190° C., at which temperature the reaction was performed for 6 hours. After 6 hours, the reactor was further heated to 210° C. and maintained at 100 Torr for 1 hour. The reactor was heated to 260° C. and maintained at 20 Torr for 1 hour, and then was decompressed to 0.5 Torr and maintained for 1 hour. Then, 0.03 phr of antioxidants and 0.05 phr of phosphorous heat stabilizers were added to the melt polymer and mixed to form a uniform mixture for about 10 minutes (phosphorus content: 1.2%).

Example 2

2.70 kg of 2,2-bis(4-hydroxyphenyl)propane (bisphenol A), 0.25 kg of 4,4'-biphenol, 2.63 kg of diphenyl carbonate, 0.42 kg of diphenyl phenylphosphonate, and 150 ppb of KOH (based on 1 mol of bisphenol A) were sequentially added to a reactor, and oxygen in the reactor was removed using nitrogen. Then, polymerization was performed in the same manner as in Example 1 (phosphorus content: 2.3%)

Example 3

2.70 kg of 2,2-bis(4-hydroxyphenyl)propane (bisphenol A), 0.25 kg of 4,4'-biphenol, 2.34 kg of diphenyl carbonate, 0.85 kg of diphenyl phenylphosphonate, and 150 ppb of KOH (based on 1 mol of bisphenol A) were sequentially added to a reactor, and oxygen in the reactor was removed using nitrogen. Then, polymerization was performed in the same manner as in Example 1 (phosphorus content: 2.3%).

Example 4

2.40 kg of 2,2-bis(4-hydroxyphenyl)propane (bisphenol A), 0.49 kg of 4,4'-biphenol, 2.34 kg of diphenyl carbonate, 0.85 kg of diphenyl phenylphosphonate, and 150 ppb of KOH (based on 1 mol of bisphenol A) were sequentially added to a reactor, and oxygen in the reactor was removed using nitrogen. Then, polymerization was performed in the same manner as in Example 1 (phosphorus content: 2.3%).

Example 5

2.40 kg of 2,2-bis(4-hydroxyphenyl)propane (bisphenol A), 0.49 kg of 4,4'-biphenol, 2.05 kg of diphenyl carbonate, 1.27 kg of diphenyl phenylphosphonate, and 150 ppb of KOH (based on 1 mol of bisphenol A) were sequentially added to a reactor, and oxygen in the reactor was removed using nitrogen. Then, polymerization was performed in the same manner as in Example 1 (phosphorus content: 3.5%).

Comparative Example 1

3.00 kg of 2,2-bis(4-hydroxyphenyl)propane (bisphenol A), 2.93 kg of diphenyl carbonate, and 150 ppb of KOH (based on 1 mol of bisphenol A) were sequentially added to a reactor, and oxygen in the reactor was removed using nitrogen. Then, polymerization was performed in the same manner as in Example 1.

Comparative Example 2

15 weight parts of bisphenol A diphosphate (CR-741) as a phosphorous flame retardant was blended to 100 weight parts of polycarbonate resin prepared in Comparative Example 1 to obtain a resin composition.

Comparative Example 3

3 weight parts of Methyl methacrylate-Butadiene-ethyl-acrylate (EXL 2602, KUREHA CHEM.) as an impact modifier and 15 weight parts of bisphenol A diphosphate (CR-741) as a phosphorous flame retardant were added to 100 weight parts of the polycarbonate resin prepared in Comparative Example 1 to obtain a resin composition.

Comparative Example 4

15 weight parts of polycarbonate-polysiloxane copolymer (RC-1700, IDEMITSU), and 15 weight parts of bisphenol A diphosphate (CR-741) as a phosphorous flame retardant were added to 85 weight parts of the polycarbonate resin prepared in Comparative Example 1 to obtain a resin composition.

Comparative Example 5

2.40 kg of 2,2-bis(4-hydroxyphenyl)propane (bisphenol A), 0.49 kg of 4,4'-biphenyl, 2.93 kg of diphenyl carbonate, and 150 ppb of KOH (based on 1 mol of bisphenol A) were sequentially added to a reactor, and oxygen in the reactor was removed using nitrogen. Then, polymerization was performed in the same manner as in Example 1. 15 weight parts of bisphenol A diphosphate (CR-741) as a phosphorous flame retardant was added to 100 weight parts of the prepared polycarbonate resin to obtain a resin composition.

Comparative Example 6

3.00 kg of 2,2-bis(4-hydroxyphenyl)propane (bisphenol A), 2.05 kg of diphenyl carbonate, 1.05 kg of diphenyl phenylphosphonate, and 150 ppb of KOH (based on 1 mol of bisphenol A) were sequentially added to a reactor, and oxygen in the reactor was removed using nitrogen. Then, polymerization was performed in the same manner as in Example 1. 10 weight parts of polycarbonate-polysiloxane copolymer (RC-1700, IDEMITSU) was added to 90 weight parts of the prepared polycarbonate to obtain a resin composition.

100 weight parts of the respective polycarbonate resins prepared in Examples and Comparative Examples, 0.03 weight parts of octadecyl 3-(3,5-di-tert-4-hydroxyphenyl) propionate as an antioxidant and 0.03 weight parts of tris(2,4-di-tert-butylphenyl)phosphate (Irgafox 168, CIBA GEIGY) as a phosphorous antioxidant were extruded in a twin-screw extruder (L/D=36 and 0=32) at the temperature of 270 and formed into pellets using a pelletizer. Physical properties of the prepared pellets were evaluated as follows and the results were shown in Table 2.

Evaluation Methods of Physical Properties (1) Transmittance: visible light transmittance was measured for 2.5 mm thick specimens obtained by injection molding using a hazemeter (Gmbh 4725, BYK-Gardner).

(2) Glass transition temperature (° C.): Glass transition temperature was measured at a temperature increase rate of 10° C. per minute using DSC (Q100, TA Instruments)

(3) Flame retardancy: Flame retardancy was measured for respective specimens having 0.8 mm, 1.6 mm and 3.2 mm thickness according to UL-94 flame retardant regulation (4) Impact strength at room temperature (kgf·cm/cm): The prepared pellets were formed into a ⅛" IZOD specimen at a molding temperature of 270° C. and a mold temperature of 70° C. using an injection machine (DHC 120WD, 120 ton, Dongshin en-Tech Co., Ltd.), followed by evaluation according to ASTM D256 (⅛", notched).

(5) Chemical resistance:
Chemical resistance to alcohols: A tensile specimen in accordance with ASTM D638 was prepared via injection molding, after which a 2.1% strain was applied to the specimen according to ASTM D543 for evaluating Environmental Stress Crack Resistance, and methanol and isopropyl alcohol were dropped thereto. After 10 minutes, cracks generated on a curved part of the specimen were observed. (⊚: No Crack, ○: Fine cracks, Δ: Many cracks, X: Haze of cracks)
Transmittance after immersing in coating solution: A 2.5 mm flat specimen was immersed in a coating thinner (main ingredients: methyl isobutyl ketone, cyclohexanone and 2-ethoxyethanol) for a polycarbonate resin for 2 minutes and dried at 80° C. for 30 minutes, followed by measurement of visible light transmittance (%) using a hazemeter (Gmbh 4725, BYK-Gardner).

Also, transmittance difference (ΔT) was calculated by Equation 1 and evaluated:

$$\Delta T = \frac{T_0 - T_1}{T_0} \times 100 \quad \text{[Equation 1]}$$

(wherein $T_0$ is initial visible light transmittance of a 2.5 mm thick sample, and $T_1$ is visible light transmittance of the sample obtained by immersing the sample in a solution consisting of methyl isobutyl ketone, cyclohexanone and 2-ethoxy ethanol for 2 minutes and then drying the sample at 80° C. for 30 minutes).

TABLE 1

| | | Examples | | | | | Comparative Examples | | | | | |
|---|---|---|---|---|---|---|---|---|---|---|---|---|
| | | 1 | 2 | 3 | 4 | 5 | 1 | 2 | 3 | 4 | 5 | 6 |
| PC chain structure (mol %) | BPA | 95 | 90 | 90 | 80 | 80 | 100 | 100 | 100 | 100 | 80 | 100 |
| | BP | 5 | 10 | 10 | 20 | 20 | — | — | — | — | 20 | — |
| | DPC | 95 | 90 | 80 | 80 | 90 | 100 | 100 | 100 | 100 | 100 | 70 |
| | PDPP | 5 | 10 | 20 | 20 | 10 | — | — | — | — | — | 30 |
| Resin composition | PC (phr) | 100 | 100 | 100 | 100 | 100 | 100 | 100 | 100 | 85 | 100 | 85 |
| | Si-PC (phr) | — | — | — | — | — | — | — | — | 15 | — | 15 |
| | phosphorous flame retardant (phr) | — | — | — | — | — | — | 15 | 15 | 15 | 15 | — |
| | impact modifier | — | — | — | — | — | — | — | 3 | — | — | — |

TABLE 2

|  |  | Examples | | | | | Comparative Examples | | | | | |
| --- | --- | --- | --- | --- | --- | --- | --- | --- | --- | --- | --- | --- |
|  |  | 1 | 2 | 3 | 4 | 5 | 1 | 2 | 3 | 4 | 5 | 6 |
|  | Transmittance (%) | 90.1 | 90.1 | 90.2 | 90.1 | 90.0 | 90.2 | 89.0 | opaque | 85.0 | 89.0 | 90.1 |
|  | Tg ( ) | 144 | 140 | 135 | 138 | 135 | 145 | 105 | 95 | 105 | 108 | 130 |
| Flame | 0.8 mm | V2 | V2 | V0 | V0 | V0 | V2 | V2 | V2 | V2 | V2 | V0 |
| retardancy | 1.6 mm | V2 | V0 | V0 | V0 | V0 | V2 | V2 | V2 | V0 | V2 | V0 |
| (UL-94) | 3.2 mm | V0 | V0 | V0 | V0 | V0 | V2 | V0 | V0 | V0 | V0 | V0 |
|  | Impact strength at room temperature (⅛") | 63 | 55 | 40 | 38 | 33 | 85 | 2 | 50 | 2 | 3 | 30 |
| Chemical | Alcohols* | Δ | ◎ | ◎ | ◎ | ◎ | X | X | X | Δ | ◎ | Δ |
| resistance | Transmittance after immersing in coating solution (%) | 80 | 85 | 85 | 88 | 88 | Less than 30 | Less than 30 | Less than 30 | 55 | 88 | Less than 30 |
|  | Transmittance difference (ΔT) | 11.2 | 5.6 | 5.7 | 2.3 | 2.2 | 66.7 or more | 66.2 or more | — | 35.3 | 1.1 | 66.7 or more |

As indicated in Table 2, it was found that the polycarbonate of the present invention had all of excellent flame retardancy, transparency, impact strength and chemical resistance. On the contrary, in Comparative Examples 2-5, which blended the flame retardant, it was found that the synergistic effect of flame retardancy was not so high as compared with the added amount of the flame, and transparency and impact strength were remarkably decreased, or heat resistance and chemical resistance were deteriorated. Further, it was found that Comparative Example 6, where was copolymerized with phosphate esters but not with biphenyl diols, did not have sufficient heat resistance and impact strength, and had remarkably decreased chemical resistance.

Although some embodiments have been disclosed herein, it should be understood that these embodiments are provided by way of illustration only, and that various modifications, changes, and alterations can be made without departing from the spirit and scope of the invention. Therefore, the scope of the invention should be limited only by the accompanying claims and equivalents thereof.

The invention claimed is:

1. A polycarbonate comprising repeating units represented by Formula 1, Formula 2, Formula 3 and Formula 4, respectively:

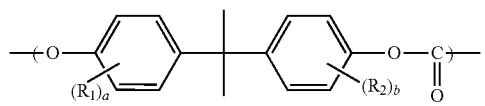

[Formula 1]

wherein $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, and a and b are each independently an integer from 0 to 4;

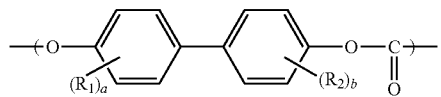

[Formula 2]

wherein $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, and a and b are each independently an integer from 0 to 4;

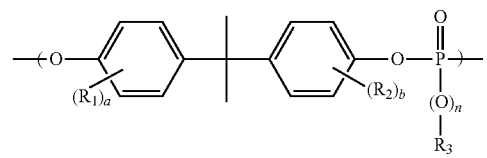

[Formula 3]

wherein $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, $R_3$ is substituted or unsubstituted C1 to C6 alkyl group, substituted or unsubstituted C6 to C12 aryl group, substituted or unsubstituted C7 to C20 aralkyl group, a and b are each independently an integer from 0 to 4, and n is 0 or 1; and

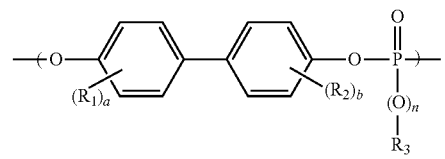

[Formula 4]

wherein $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, $R_3$ is substituted or unsubstituted C1 to C6 alkyl group, substituted or unsubstituted C6 to C12 aryl group, substituted or unsubstituted C7 to C20 aralkyl group, a and b are each independently an integer from 0 to 4, and n is 0 or 1.

2. A polycarbonate containing about 1~50 mol % of repeating units of Formula 4 based on the whole repeating units, and having a glass transition temperature of about 130 to about 190° C., a flame retardancy of V-0, as measured on a 3.2 mm thick specimen according to the UL-94, a notched IZOD impact strength of about 25 to about 120 kg·cm/cm, as measured on a ⅛" thick specimen at room temperature according to ASTM D256, and a transmittance difference (ΔT) of about 12% or less, as calculated by the following Equation 1:

[Formula 4]

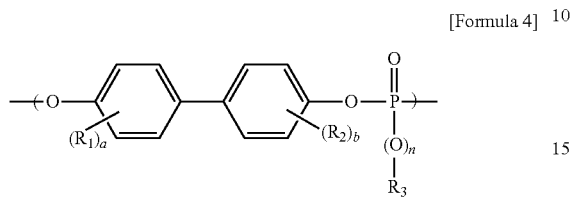

wherein $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom; $R_3$ is substituted or unsubstituted C1 to C6 alkyl group, substituted or unsubstituted C6 to C12 aryl group, substituted or unsubstituted C7 to C20 aralkyl group, a and b are each independently an integer from 0 to 4, and n is 0 or 1, $$\Delta T = \frac{T_0 - T_1}{T_0} \times 100 \quad \text{[Equation 1]}$$

wherein, $T_0$ is initial visible light transmittance of a 2.5 mm thick sample, and $T_1$ is visible light transmittance of the sample obtained by immersing the sample in a solution consisting of methyl isobutyl ketone, cyclohexanone and 2-ethoxy ethanol for 2 minutes and then drying the sample at 80° C. for 30 minutes.

3. The polycarbonate as claimed in claim 1, wherein the polycarbonate comprises repeating units of Formula 1 (M1), Formula 2 (M2), Formula 3 (M3) and Formula 4 (M4) in mole ratio of M1:M2:M3:M4=about 20~90 mol %:about 5~50 mol %:about 1~50 mol %:about 1~50 mol %:

[Formula 1]

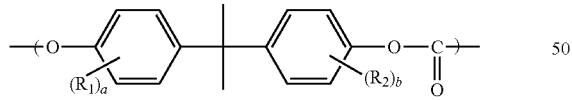

wherein $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, and a and b are each independently an integer from 0 to 4;

[Formula 2]

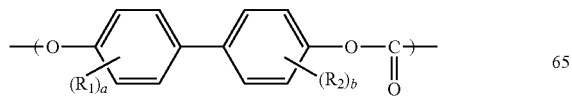

wherein $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, and a and b are each independently an integer from 0 to 4;

[Formula 3]

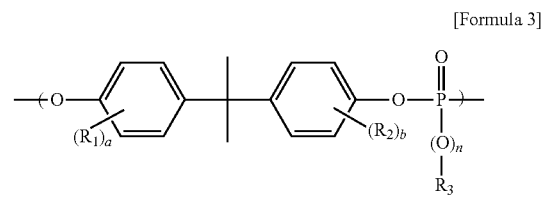

wherein, $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, $R_3$ is substituted or unsubstituted C1 to C6 alkyl group, substituted or unsubstituted C6 to C12 aryl group, substituted or unsubstituted C7 to C20 aralkyl group, a and b are each independently an integer from 0 to 4, and n is 0 or 1; and

[Formula 4]

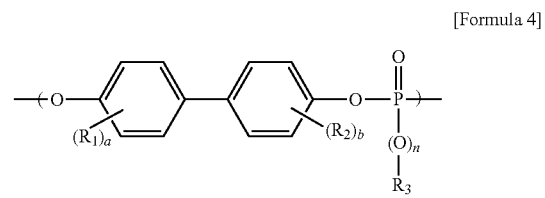

wherein $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, $R_3$ is substituted or unsubstituted C1 to C6 alkyl group, substituted or unsubstituted C6 to C12 aryl group, substituted or unsubstituted C7 to C20 aralkyl group, a and b are each independently an integer from 0 to 4, and n is 0 or 1.

4. A method of preparing polycarbonate, comprising transesterifying diols comprising Formula 1-1 and Formula 2-1 with carbonate ester and phosphate ester:

[Formula 1-1]

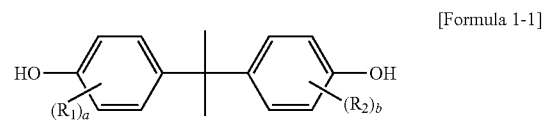

wherein $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, and a and b are each independently an integer from 0 to 4; and

[Formula 2-1]

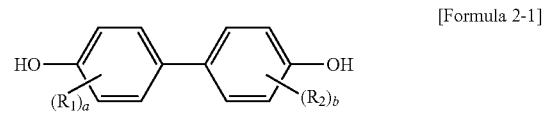

wherein $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom; and a and b are each independently an integer from 0 to 4.

5. The method as claimed in claim 4, wherein the phosphate ester is at least one of aromatic phosphates and aromatic phosphonates.

6. The method as claimed in claim 4, wherein the phosphate ester is represented by Formula 4-1:

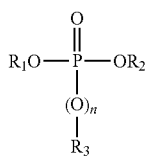

[Formula 4-1]

wherein $R_1$ and $R_2$ are each independently C6 to C12 aryl group, or C6 to C12 aryl group substituted by C1 to C12; $R_3$ is substituted or unsubstituted C1 to C6 alkyl group, substituted or unsubstituted C6 to C12 aryl group, substituted or unsubstituted C7 to C20 aralkyl group; n is 0 or 1.

7. The method as claimed in claim 4, wherein the mole ratio of Formula 1-1 to Formula 2-1 is about 60~95 mol %: 5~40 mol %.

8. The method as claimed in claim 4, wherein the mole ratio of the carbonate esters to the phosphate esters is about 60~99 mol %: 1~40 mol %.

9. A thermoplastic resin composition comprising:
the polycarbonate of claim 1; and
a thermoplastic resin.

10. The thermoplastic resin composition as claimed in claim 9, wherein the thermoplastic resin composition further comprises additives selected from the group consisting of antioxidants, nucleation agents, surfactants, coupling agents, fillers, plasticizers, lubricants, antimicrobial agents, release agents, heat stabilizers, light stabilizers, compatibilizers, inorganic additives, coloring agents, stabilizers, antistatic agents, pigments, dyes and flame proofing agents.

11. The polycarbonate as claimed in claim 2, wherein the polycarbonate comprises repeating units of Formula 1 (M1), Formula 2 (M2), Formula 3 (M3) and Formula 4 (M4) in mole ratio of M1:M2:M3:M4=about 20~90 mol %:about 5~50 mol %:about 1~50 mol %:about 1~50 mol %:

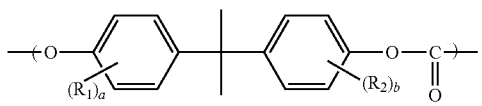

[Formula 1]

wherein $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, and a and b are each independently an integer from 0 to 4;

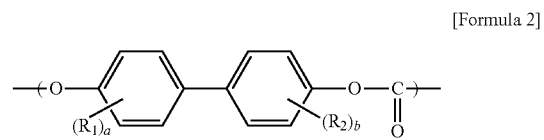

[Formula 2]

wherein $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, and a and b are each independently an integer from 0 to 4;

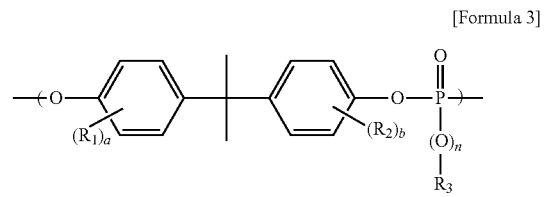

[Formula 3]

wherein $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, $R_3$ is substituted or unsubstituted C1 to C6 alkyl group, substituted or unsubstituted C6 to C12 aryl group, substituted or unsubstituted C7 to C20 aralkyl group, a and b are each independently an integer from 0 to 4, and n is 0 or 1; and

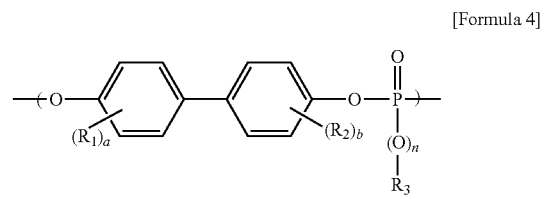

[Formula 4]

wherein $R_1$ and $R_2$ are each independently substituted or unsubstituted C1 to C6 alkyl group, substituted or unsubstituted C3 to C6 cycloalkyl group, substituted or unsubstituted C6 to C12 aryl group or halogen atom, $R_3$ is substituted or unsubstituted C1 to C6 alkyl group, substituted or unsubstituted C6 to C12 aryl group, substituted or unsubstituted C7 to C20 aralkyl group, a and b are each independently an integer from 0 to 4, and n is 0 or 1.

12. A thermoplastic resin composition comprising:
the polycarbonate of claim 2; and
a thermoplastic resin.

13. The thermoplastic resin composition as claimed in claim 12, wherein the thermoplastic resin composition further comprises additives selected from the group consisting of antioxidants, nucleation agents, surfactants, coupling agents, fillers, plasticizers, lubricants, antimicrobial agents, release agents, heat stabilizers, light stabilizers, compatibilizers, inorganic additives, coloring agents, stabilizers, antistatic agents, pigments, dyes and flame proofing agents.

* * * * *

UNITED STATES PATENT AND TRADEMARK OFFICE
CERTIFICATE OF CORRECTION

| | |
|---|---|
| PATENT NO. | : 9,765,184 B2 |
| APPLICATION NO. | : 14/345459 |
| DATED | : September 19, 2017 |
| INVENTOR(S) | : Jun Ho Chi et al. |

Page 1 of 1

It is certified that error appears in the above-identified patent and that said Letters Patent is hereby corrected as shown below:

In the Specification

Column 12, Line 7 delete "twin-screw extruder(L/D=36 AND 0=32)," and insert: --twin-screw extruder (L/D=36 and Φ=32) at the temperature--

Column 12, Line 8 delete "of 270 and formed into pellets using a pelletizer. Physical" and insert: --of 270°C. and formed into pellets using a pelletizer. Physical--

Signed and Sealed this
Twenty-fourth Day of April, 2018

Andrei Iancu
*Director of the United States Patent and Trademark Office*